United States Patent
Kurauchi et al.

(10) Patent No.: US 10,177,966 B2
(45) Date of Patent: Jan. 8, 2019

(54) VEHICLE CONTROL SYSTEM, MOTOR DRIVE CONTROLLER, AND MANAGEMENT CONTROLLER

(71) Applicant: HONDA MOTOR CO., LTD., Tokyo (JP)

(72) Inventors: Atsushi Kurauchi, Wako (JP); Shinji Mikami, Wako (JP); Yasuhiro Ohara, Wako (JP); Yoichi Yamashiro, Wako (JP); Yoshikazu Fujimoto, Wako (JP); Shintaro Mito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/465,598

(22) Filed: Mar. 22, 2017

(65) Prior Publication Data
US 2017/0288951 A1    Oct. 5, 2017

(30) Foreign Application Priority Data
Mar. 31, 2016 (JP) ................. 2016-070170

(51) Int. Cl.
*H04W 56/00* (2009.01)
*H04L 12/24* (2006.01)
(Continued)

(52) U.S. Cl.
CPC ......... *H04L 41/0668* (2013.01); *B60W 10/08* (2013.01); *B60W 20/50* (2013.01);
(Continued)

(58) Field of Classification Search
CPC . H04L 41/0668; H04L 43/0811; H04L 67/12; B60W 10/08; B60W 20/50;
(Continued)

(56) References Cited

U.S. PATENT DOCUMENTS

| | | | | |
|---|---|---|---|---|
| 2006/0015231 A1* | 1/2006 | Yoshimura | ............... | B60K 6/46 701/48 |
| 2015/0274023 A1* | 10/2015 | Houivet | .................... | B60L 3/04 320/108 |
| 2017/0288951 A1* | 10/2017 | Kurauchi | ............ | H04L 41/0668 |

FOREIGN PATENT DOCUMENTS

| | | |
|---|---|---|
| JP | 05-097004 | 4/1993 |
| JP | 2014-028586 | 2/2014 |
| JP | 2014-118272 | 6/2014 |

OTHER PUBLICATIONS

Japanese Office Action for corresponding JP Application No. 2016-070170, dated Aug. 22, 2017.

* cited by examiner

*Primary Examiner* — Afshawn M Towfighi
(74) *Attorney, Agent, or Firm* — Mori & Ward, LLP

(57) ABSTRACT

A vehicle control system includes electronic controllers and first and second communications networks. The electronic controllers control a vehicle including an internal combustion engine and a drive motor. The electronic controllers include a management controller to manage travel control of the vehicle and a motor drive controller to control the drive motor. The first and second communications networks connect the electronic controllers together. The electronic controllers communicate via the first and second communications networks. The motor drive controller is configured to stop the drive motor when it is determined that a fault has occurred in the first communications network and configured to transmit information indicating that the fault has occurred in the first communications network to the management controller via the second communications network. The management controller is configured to control the electronic controllers not to communicate via the first communications network in response to the information.

20 Claims, 7 Drawing Sheets

(51) Int. Cl.
  *H04L 29/08* (2006.01)
  *H04L 12/26* (2006.01)
  *B60W 10/08* (2006.01)
  *B60W 20/50* (2016.01)
(52) U.S. Cl.
  CPC .......... *H04L 43/0811* (2013.01); *H04L 67/12* (2013.01); *B60W 2510/06* (2013.01); *B60W 2510/08* (2013.01); *B60W 2710/06* (2013.01); *B60W 2710/08* (2013.01)
(58) Field of Classification Search
  CPC ......... B60W 2710/08; B60W 2710/06; B60W 2510/08; B60W 2510/06
  See application file for complete search history.

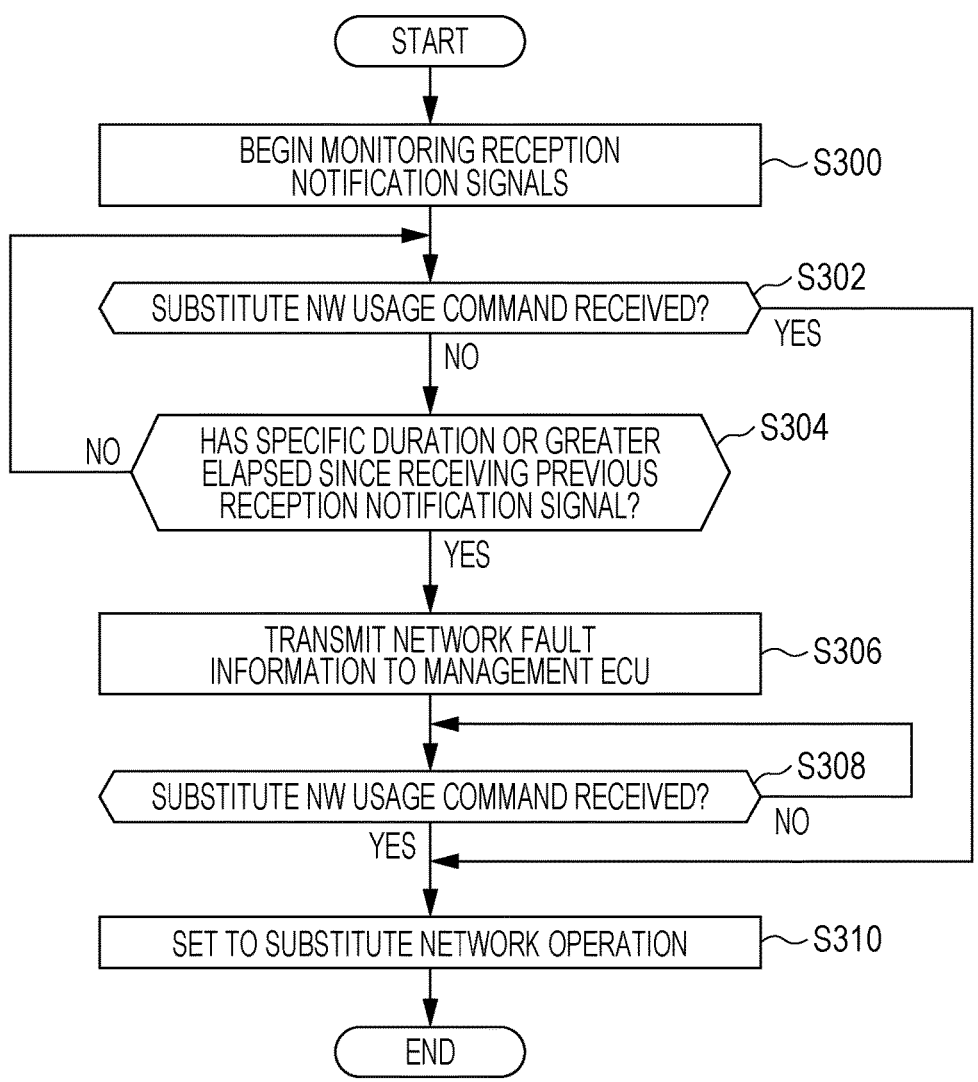

VEHICLE CONTROL SYSTEM, MOTOR DRIVE CONTROLLER, AND MANAGEMENT CONTROLLER

CROSS-REFERENCE TO RELATED APPLICATIONS

The present application claims priority under 35 U.S.C. § 119 to Japanese Patent Application No. 2016-070170, filed Mar. 31, 2016, entitled "Vehicle Control System." The contents of this application are incorporated herein by reference in their entirety.

BACKGROUND

1. Field

The present disclosure relates to a vehicle control system, a motor drive controller, and a management controller.

2. Description of the Related Art

Hitherto, as a vehicle control system in a hybrid vehicle including an internal combustion engine and a motor (referred to below as "drive motor") to drive the wheels, a vehicle control system is known that includes plural Electronic Control Units (ECUs), including a motor control ECU that controls the drive motor and a management ECU that controls devices other than the drive motor, and two mutually independent communications networks of a first communications network and a second communications network, respectively configured by two independent Controller Area Network (CAN) buses. Accordingly, even if one communications network becomes faulty, necessary communication can be sustained, and drive of the wheels by the drive motor can be continued, using a simple configuration and simple processing (Japanese Unexamined Patent Application Publication No. 2014-118272).

In this vehicle control system, a transmission speed of the second communications network is slower than a transmission speed of the first communications network, and each ECU exchanges travel data necessary for travel control and data for improving travel comfort (referred to below as "comfort improvement data") over the first communications network, and exchanges the travel data over the second communications network. When the first communications network and the second communications network are both operating normally, the motor control ECU receives the travel data and the comfort improvement data, and performs travel control with an emphasis on comfort. When the first communications network becomes faulty, only the travel data is received through the second communications network. Travel comfort is sacrificed, and only functions essential for travel are executed.

Accordingly, in this vehicle control system, when the first communications network becomes faulty, the transmission processing of each ECU does not change, and only reception processing is changed (namely, changed such that only travel data received over the second communications network is received and employed), thereby enabling faults in the communications network to be handled in a simple fashion.

However, in the related vehicle control system described above, the same data is transmitted redundantly over the two communications networks, since it is necessary to transmit real-time information necessary for vehicle travel control (namely, drive motor control) over both the first communications network and the second communications network at all times. As a result, the utilization rate (the ratio of actually transmitted information (excluding redundant information) against overall communication capacity) of the communication capacity of the first communications network and the second communications network is low, and the amount of electric power used for transmission also increases. Namely, the related vehicle control system described above leaves room for further improvement from the perspectives of effective utilization of communication capacity, as well as energy saving.

SUMMARY

According to a first aspect of the present invention, a vehicle control system includes electronic controllers, a first communications network, and a second communications network. The electronic controllers control a vehicle including an internal combustion engine and a drive motor to move the vehicle. The electronic controllers include a management controller to manage travel control of the vehicle and a motor drive controller to control the drive motor. The first communications network connects the electronic controllers together. The electronic controllers communicate via the first communications network. The second communications network connects the electronic controllers together. The electronic controllers communicate via the second communications network. The motor drive controller is configured to stop the drive motor when it is determined that a fault has occurred in the first communications network and configured to transmit information indicating that the fault has occurred in the first communications network to the management controller via the second communications network. The management controller is configured to control the electronic controllers not to communicate via the first communications network in response to the information.

According to a second aspect of the present invention, a vehicle control system includes electronic controllers, a first communications network, and a second communications network. The electronic controllers control a vehicle including an internal combustion engine and a drive motor to move the vehicle. The electronic controllers include a management controller to manage travel control of the vehicle and a motor drive controller to control the drive motor. The first communications network connects the electronic controllers together. The electronic controllers communicate via the first communications network. The second communications network connects the electronic controllers together. The electronic controllers communicate via the second communications network. Each of the electronic controllers is configured to detect a fault in the first communications network and configured to transmit information indicating that the fault has occurred in the first communications network to the management controller via the second communications network. The management controller is configured to determine that the fault has occurred in the first communications network when the management controller has detected the fault in the first communications network, and/or when the management controller has received the information from at least one of the electronic controllers, the management controller being configured to control the electronic controllers not to communicate via the first communications network and to control the motor drive controller to stop the drive motor when it is determined that the fault occurs in the first communications network.

According to a third aspect of the present invention, a motor drive controller that is one of electronic controllers in a vehicle control system including the electronic controllers to control a vehicle including an internal combustion engine and a drive motor to move the vehicle, a first communications network which connects the electronic controllers together and via which the electronic controllers communicate, and a second communications network which connects the electronic controllers together and via which the electronic controllers communicate, the motor drive controller includes a first transceiver, a second transceiver, a fault detector, a motor controller, and a fault processor. The first transceiver is configured to communicate via the first communications network. The second transceiver is configured to communicate via the second communications network. The fault detector is configured to detect a fault in the first communications network. The motor controller is configured to control the drive motor. The fault processor is configured to control the second transceiver to transmit information indicating that the fault has occurred in the first communications network via the second communications network to a management controller that is one of the electronic controllers and to control the motor controller to stop the drive motor in response to detecting the fault in the first communications network.

According to a fourth aspect of the present invention, a management controller that is one of electronic controllers in a vehicle control system including the electronic controllers to control a vehicle including an internal combustion engine and a drive motor to move the vehicle, a first communications network which connects the electronic controllers together and via which the electronic controllers communicate, and a second communications network which connects the electronic controllers together and via which the electronic controllers communicate, the management controller includes a first transceiver, a second transceiver, and a fault processor. The first transceiver is configured to communicate via the first communications network. The second transceiver is configured to communicate via the second communications network. The fault processor is configured to control the electronic controllers not to communicate via the first communications network and to control a motor drive controller to stop the drive motor on receiving information via the second transceiver indicating that the fault has occurred in the first communications network.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a flowchart illustrating a network fault processing routine of another ECU, which is neither the management ECU nor the motor control ECU, provided to the vehicle control system illustrated in FIG. 1.

DESCRIPTION OF THE EMBODIMENTS

Figure 1:
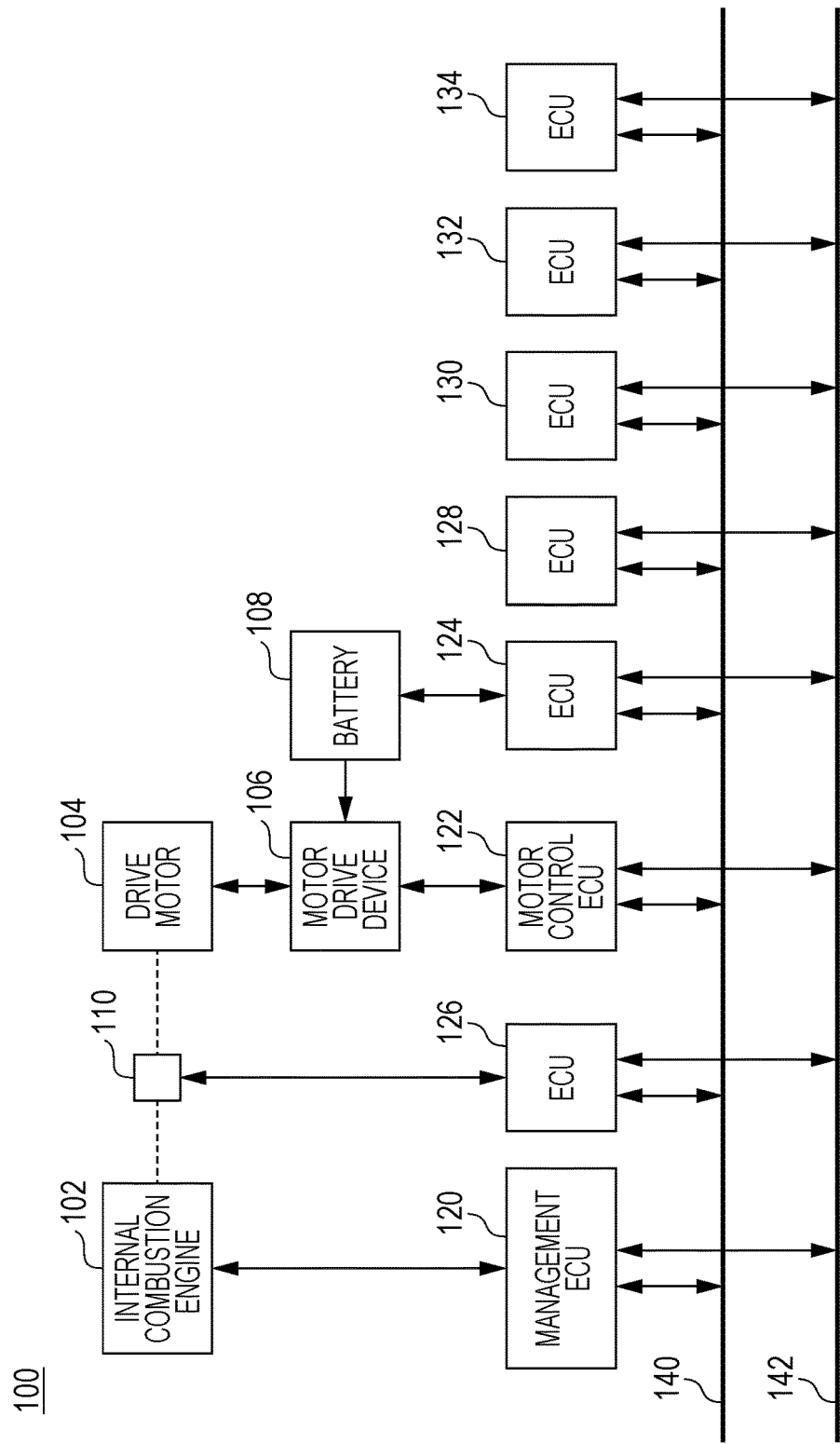
FIG. 1 is a diagram illustrating a configuration of a vehicle control system according to an embodiment of the present disclosure.

The embodiments will now be described with reference to the accompanying drawings, wherein like reference numerals designate corresponding or identical elements throughout the various drawings.

Explanation follows regarding an embodiment of the present disclosure, with reference to the drawings.

FIG. 1 is a diagram illustrating a configuration of a vehicle control system according to an embodiment of the present disclosure. A vehicle control system 100 is installed in a hybrid vehicle, and controls an internal combustion engine 102 and a drive motor 104 that drive the wheels of the hybrid vehicle. The drive motor 104 operates by receiving an electric power supply from a battery 108 that is charged by a generator (not illustrated in the drawings) connected to the internal combustion engine 102, for example, through a motor drive device 106. A crank shaft of the internal combustion engine 102 and a rotation shaft of the drive motor 104 are connected to a transmission 110, and the transmission 110 connects and disconnects the crank shaft of the internal combustion engine 102 and the rotation shaft of the drive motor 104 under the control of an ECU 126, described later.

The vehicle control system 100 includes plural Electric Control Units (ECUs) 120, 122, 124, 126, 128, 130, 132, and 134 that control operation of the vehicle; and a first communications network 140 and a second communications network 142 that are connected so as to enable the plural ECUs to communicate with each other.

The respective ECUs generate travel control information, this being real-time information necessary for real-time control of vehicle travel (for example, information that needs to be immediately reflected in travel control), at a first specific time interval. Each of the ECUs also generates travel management information, this being information other than real-time information relating to travel operation (for example, travel operation state monitoring information, setting information affecting travel control, and the like), at, for example, a second specific time interval that is longer than the first specific time interval. Examples of the travel control information and the travel management information output from the respective ECUs will be described later.

Each of the ECUs transmits the generated travel control information and/or travel management information to the other ECUs over the first communications network 140 and/or the second communications network 142. The other ECUs receive the generated travel control information and/or travel management information over the first communications network 140 and/or the second communications network 142.

The first communications network 140 and the second communications network 142 are two independent communications networks connected such that the ECUs 120, 122, 124, 126, 128, 130, 132, and 134 are capable of communicating with each other, and are, for example, configured by two independent CAN (Controller Area Network) buses using CAN communication protocol standards.

Moreover, the first communications network 140 has a faster communication speed than the second communications network 142, and is principally employed in transmission of the travel control information described above. The second communications network 142 is principally employed in transmission of the travel management information described above.

The ECU 120 is a management controller that performs overall management and control of vehicle control operations. For example, the ECU 120 determines the torque to be generated in the internal combustion engine 102, and the torque and torque balance to be generated in the drive motor 104, in order to drive the wheels, and determines start and stop timings of energy recovery operations for the battery 108 by the drive motor 104, according to a load state of the traveling vehicle (such as acceleration corresponding to an accelerator pedal depression amount). Moreover, when a fault has been detected in the first communications network 140 (for example, a fault caused by disconnection of a line in the bus configuring the first communications network 140), the ECU 120 transmits to the other ECUs 122, 124, 126, 128, 130, 132, and 134 a substitute network usage command (referred to below as a "substitute NW usage command") prohibiting use of the first communications network 140, and instructing that travel control information be passed over the second communications network 142. The ECU 120 is also referred to hereafter as the management ECU 120.

In the present embodiment, the management ECU 120 functions as an ECU that controls operation of the internal combustion engine 102 (for example, also functions as what is referred to as a Fuel Injection (FI) ECU that controls fuel injection and the like in the internal combustion engine 102). The management ECU 120 receives travel control information transmitted from the ECU 122 and the like, described later, and based on the received travel control information and the like, performs overall management and control of vehicle control operations, as well as controlling operation of the internal combustion engine 102.

As the travel control information, the management ECU 120 outputs, for example, real-time information including required torque information for the internal combustion engine 102 and the drive motor 104 based on the determined torque balance mentioned above (the required torque information includes instructions to start and stop torque generation operations), and information necessary for operation control of the drive motor 104 during combined operation of the drive motor 104 and the internal combustion engine 102 (for example, an engine revolution speed of the internal combustion engine 102). Moreover, as the travel management information, the management ECU 120 outputs information indicating an operation state of the internal combustion engine 102 (temperature, fuel consumption, and the like of the internal combustion engine 102).

The ECU 122 is a motor drive controller that controls operation of the drive motor 104 through the motor drive device 106. The ECU 122 is also referred to below as the "motor control ECU 122". The motor control ECU 122 receives travel control information transmitted from the management ECU 120 and the like, and controls operation of the drive motor 104 based on the received travel control information.

As the travel control information, the motor control ECU 122 outputs, for example, information necessary for real-time computation of the torque balance by the management ECU 120 (revolution speed of the drive motor 104, generated torque, and the like). Moreover, as the travel management information, the motor control ECU 122 outputs, for example, information indicating an operation state of the drive motor 104 (temperature, current values, and the like of the drive motor 104).

The ECU 124 manages operation relating to the battery 108. For example, the ECU 124 monitors the remaining charge of the battery 108 (battery charge level), and determines the necessity of charging the battery 108, and the like.

As the travel control information, the ECU 124 outputs, for example, information relating to the battery output voltage required to control the drive motor 104. Moreover, as the travel management information, the ECU 124 outputs, for example, charge request information to request charging of the battery 108, battery level information, and battery level depletion rate information.

The ECU 126 controls operation of the transmission 110. The ECU 126 receives travel control information transmitted from the management ECU 120 and the like, and connects or disconnects the crank shaft of the internal combustion engine 102 and the rotation shaft of the drive motor 104 based on the received travel control information. The ECU 126 also connects or disconnects the crank shaft of the internal combustion engine 102 and/or the rotation shaft of the drive motor 104 with the wheels (not illustrated in the drawings) based on the received travel control information.

As the travel control information, the ECU 126 outputs, for example, information relating to clutch engagement states (semi-engaged, fully engaged, and the like) with the crank shaft of the internal combustion engine 102 and the rotation shaft of the drive motor 104.

The ECU 128 detects a depression amount of a brake pedal (not illustrated in the drawings), and controls wheel brakes based on the detected brake pedal depression amount and on travel control information passed from other ECUs, including the presence or absence of wheel slippage, sideways sway of the vehicle body, and the like. As the travel control information, for example, the ECU 128 outputs information of the detected depression amount of the brake pedal.

The ECU 130 detects a depression amount of an accelerator pedal (not illustrated in the drawings), and outputs the detected accelerator pedal depression amount as travel control information.

The ECU 132 employs various sensors (not illustrated in the drawings) mounted to the vehicle to gather information relating to vehicle balance, such as a wheel slippage state, and sideways swaying of the vehicle body, and outputs this gathered information as travel control information.

The ECU 134 receives the travel management information output from the respective ECUs, and determines whether or not abnormal operation is occurring. When the ECU 134 determines that a control abnormality or a device abnormality has occurred, the ECU 134 notifies the management ECU 120 of the abnormality occurrence, for example.

Note that in cases in which the first communications network 140 has developed a fault and can no longer pass the travel control information, the management ECU 120 can, as described above, send out a command (substitute NW usage command) to the other ECUs 122, 124, 126, 128, 130, 132, and 134 to prohibit the passing of information over the first communications network 140 and to instruct that the travel control information be passed using the second communications network 142.

In such cases, for example, in cases in which the motor control ECU 122 was controlling the drive motor 104, the motor control ECU 122 is unable to obtain new travel control information through the faulty first communications network 140 in the interval before the management ECU 120 detects the fault in the first communications network 140 and sends out the substitute NW usage command. Conceivably, the motor control ECU 122 could, for example, continue to control the drive motor 104 based on the last received travel control information.

However, if control of the drive motor 104 were to be continued based on the last received travel control information in this manner, this could potentially lead to unsafe travel in which vehicle travel is continued without the necessary information.

Accordingly, the vehicle control system 100 of the present embodiment is configured so as to operate in the following manner in the event of the first communications network 140 becoming faulty.

When the motor control ECU 122 detects a fault in the first communications network 140 in a state in which the drive motor 104 is being employed for vehicle travel, first, operation of the drive motor 104 is stopped, and the occurrence of the fault is notified to the management ECU 120 through the second communications network 142. In this manner, unsafe travel due to continuing vehicle travel without the necessary information is avoided.

In response to receiving notification of a fault occurrence in the first communications network 140 from any out of the motor control ECU 122 or the other ECUs 124, 126, 128, 130, 132, and 134, the management ECU 120 outputs through the second communications network 142 and to each of the ECUs 122, 124, 126, 128, 130, 132, and 134, a substitute network usage command (substitute NW usage command) prohibiting use of the first communications network 140 and instructing that travel control information be passed through the second communications network 142. Accordingly, passing of travel control information using the second communications network 142 can be started at the same time or substantially the same time in each of the ECUs 120, 122, 124, 126, 128, 130, 132, and 134 (note that if the motor control ECU 122 has received a substitute NW usage command from the management ECU 120 in a state in which a fault with the first communications network 140 has not been detected, the motor control ECU 122 executes the command and stops operation of the drive motor 104).

When a specific duration necessary for all of the ECUs, including the ECU 122, to start communicating according to the substitute NW usage command has elapsed, the management ECU 120 instructs the ECU 126 to connect the rotation shaft of the drive motor 104 and the crank shaft of the internal combustion engine 102 together, and then instructs the motor control ECU 122 to crank the internal combustion engine 102 with the drive motor 104 so as to start up the internal combustion engine 102.

Accordingly, in the vehicle control system 100, when a fault has occurred in the first communications network 140, travel can be continued using only the internal combustion engine 102, while the travel control information is communicated using the second communications network 142. Moreover, in such cases, the travel control information that was necessary for the drive motor 104 is no longer required (is not transmitted), thereby enabling the information amount of the travel control information to be reduced in comparison to during hybrid travel, in which the internal combustion engine 102 and the drive motor 104 are used in conjunction. This thereby enables both the travel management information, and the reduced amount of travel control information, to be transmitted using only the second communications network 142 in an emergency, thereby securing safe travel while also reducing the amount of spare communication capacity that needs to be secured in the design of the second communications network 142 (the communication capacity that needs to be secured in addition to the communication capacity needed to transmit the travel management information).

As a result, the vehicle control system 100 is capable of continuing safe travel without becoming incapable of travel, even when a fault has occurred in the first communications network 140. Under normal circumstances, the vehicle control system 100 is also capable of utilizing the communication capacity of the two communications networks effectively, without passing redundant information over the first communications network 140 and the second communications network 142, as happens in the related technology, and capable of reducing the electric power consumption needed for communications.

Next, explanation follows regarding configuration of the management ECU 120, the motor control ECU 122, and the other ECUs 124, 126, 128, 130, 132, and 134.

Management ECU Configuration

Figure 2:
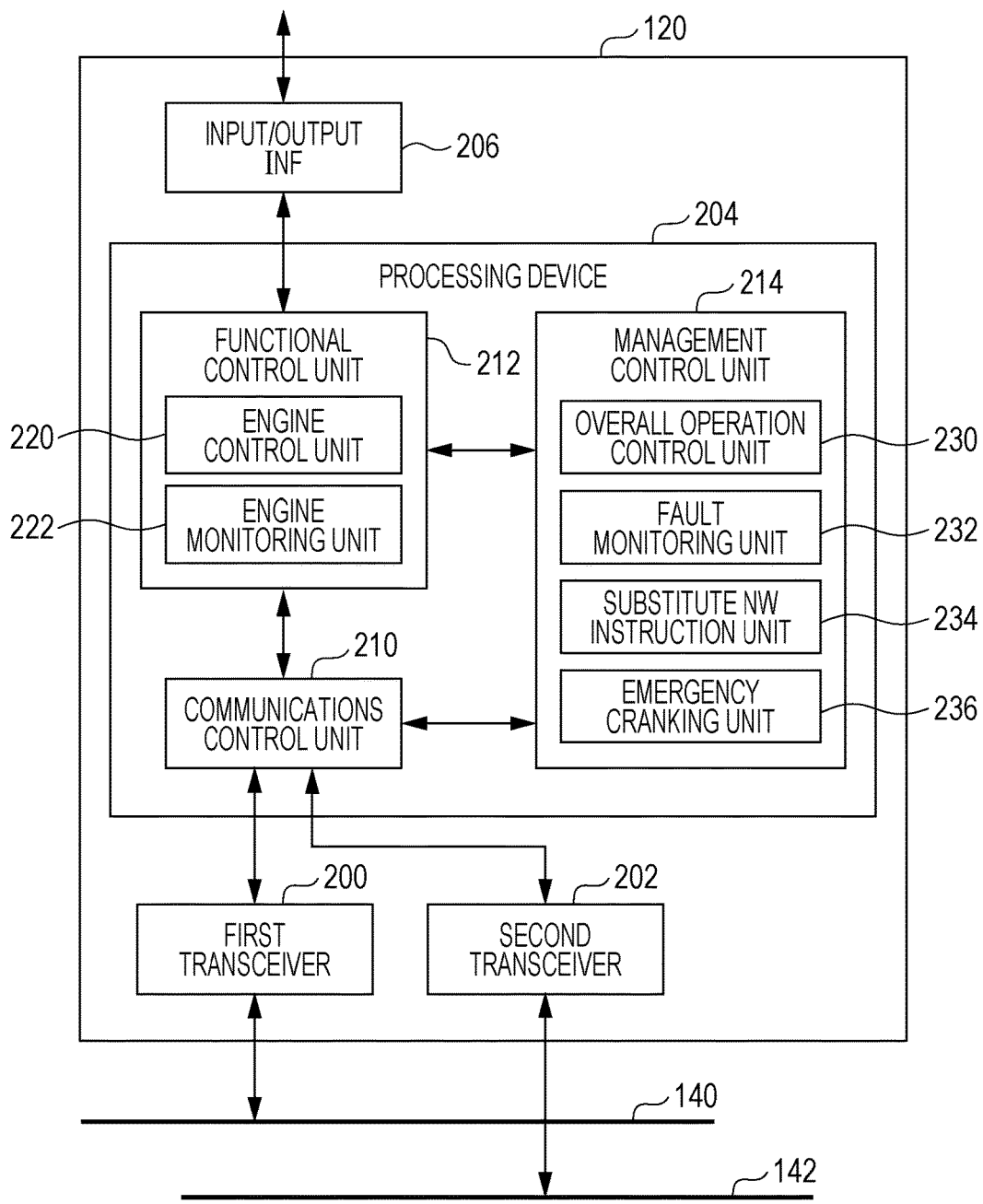
FIG. 2 is a diagram illustrating a configuration of a management ECU provided to the vehicle control system illustrated in FIG. 1.

First, explanation follows regarding configuration of the management ECU 120. FIG. 2 is a diagram illustrating configuration of the management ECU 120. The management ECU 120 includes a first transceiver 200, a second transceiver 202, a processing device 204, and an input/output interface (input/output INF) 206.

The first transceiver 200 and the second transceiver 202 are respectively transceivers for communicating over the first communications network 140 and communicating over the second communications network 142. The first transceiver 200 and the second transceiver 202 may both, for example, be CAN transceivers that communicate using the CAN communication protocol.

The first transceiver 200 and the second transceiver 202 each include a reception buffer (not illustrated in the drawings) and a transmission buffer (not illustrated in the drawings). The first transceiver 200 and the second transceiver 202 each receive data over the first communications network 140 and the second communications network 142 using the CAN communication protocol, store the received data in their respective reception buffers, and output a reception notification signal indicating that the data has been received to the processing device 204. Moreover, the first transceiver 200 and the second transceiver 202 each use the CAN communication protocol to transmit data stored in their respective transmission buffers over the first communications network 140 and the second communications network 142 in sequence, based on an order of priority indicated by an identification code (ID code) appended to the data.

The input/output INF 206 receives signals from respective sensors (not illustrated in the drawings) provided to the internal combustion engine 102, and inputs the signals to the processing device 204. The input/output INF 206 also receives signals output from the processing device 204 to respective actuators (not illustrated in the drawings) provided to the internal combustion engine 102 in order to control the internal combustion engine 102, and outputs the signals to the internal combustion engine 102.

The processing device 204 is a computer including a processor such as a Central Processing Unit (CPU), Read Only Memory (ROM) on which programs are written, Random Access Memory (RAM) for temporary data storage, a communications control unit 210, a functional control unit 212, and a management control unit 214. The functional control unit 212 includes an engine control unit 220 and an engine monitoring unit 222, and the management control unit 214 includes an overall operation control unit 230, a fault monitoring unit 232, a substitute network instruction unit (substitute NW instruction unit) 234, and an emergency cranking unit 236.

Each of the above units of the processing device 204 is implemented by the processing device 204 computer executing a program. These computer programs may be stored in advance on an appropriate computer-readable storage medium. Alternatively, or additionally, all or some of the above units may be configured from hardware, each including one or more electronic circuit components.

The fault monitoring unit 232 is a fault detection unit, and the substitute NW instruction unit 234 and the emergency cranking unit 236 are fault processing units.

The communications control unit 210 manages and controls communications over the first communications network 140 and the second communications network 142 by the first transceiver 200 and the second transceiver 202. Specifically, the communications control unit 210 receives reception notification signals respectively output by the first transceiver 200 and the second transceiver 202 on receipt of data over the respective first communications network 140 and the second communications network 142, and reads the respective data that has been received (received data) from the reception buffer of the corresponding first transceiver 200 and/or second transceiver 202 in response to receiving the reception notification signal. Moreover, the communications control unit 210 outputs the read received data to the functional control unit 212 and the management control unit 214.

The communications control unit 210 receives the travel control information and/or the travel management information from the functional control unit 212 and/or the management control unit 214, and/or stores the received travel control information in the transmission buffer (not illustrated in the drawings) of the first transceiver 200, and/or stores the received travel management information in the transmission buffer (not illustrated in the drawings) of the second transceiver 202. Note that the functional control unit 212 and/or the management control unit 214 append a code, this being a unique identification code (ID code) indicating the information priority level of each item of travel control information and travel management information, and output the travel control information and the travel management information.

The communications control unit 210 identifies whether information is travel control information or travel management information from the information ID codes received from the functional control unit 212 and/or the management control unit 214. If the information is travel control information, the information is stored in the transmission buffer of the first transceiver 200. If the information is travel management information, the information is stored in the transmission buffer of the second transceiver 202.

Moreover, when a substitute NW usage instruction has been received from the substitute NW instruction unit 234, described later, the communications control unit 210 transitions to substitute network operation. In substitute network operation, the communications control unit 210 stores all information received from the functional control unit 212 and/or the management control unit 214 in the transmission buffer of the second transceiver 202, irrespective of the information ID code. Moreover, if the first transceiver 200 is provided with a sleep mode to stop main operations and suppress electric power consumption, the communications control unit 210 transitions the first transceiver 200 to the sleep mode.

The information stored in the respective transmission buffers of the first transceiver 200 and the second transceiver 202 is output to the first communications network 140 or the second communications network 142 by the first transceiver 200 or the second transceiver 202 respectively, according to the priority level indicated by the ID code of each item of information.

Note that the second transceiver 202 may be preset with rules for how to determine the transmission priority level of the respective information passed over the second communications network 142 from the ID code appended to each item of information making up the travel management information and the travel control information in cases in which both travel management information and travel control information are stored together in the transmission buffer of the second transceiver 202.

The functional control unit 212 controls and monitors operation of the internal combustion engine 102. The functional control unit 212 also generates travel control information and travel management information, and transmits the travel control information and travel management information to the other ECUs using the communications control unit 210.

Specifically, the engine control unit 220 of the functional control unit 212 controls operation of the internal combustion engine 102 based on sensor signals from the respective sensors (not illustrated in the drawings) provided to the internal combustion engine 102, the travel control information received by the first transceiver 200 or the second transceiver 202, and/or travel control information output by the overall operation control unit 230 of the management control unit 214, described later.

Moreover, the engine monitoring unit 222 of the functional control unit 212 receives sensor signals from the respective sensors (not illustrated in the drawings) provided to the internal combustion engine 102, and, based on the received sensor signals, generates travel control information including, for example, an engine revolution speed of the internal combustion engine 102, and travel management information including, for example, temperature information and fuel consumption information relating to the internal combustion engine 102. The engine monitoring unit 222 then sends the generated travel control information and travel management information to the communications control unit 210 to be transmitted to the other ECUs.

The management control unit 214 manages and controls overall operation of the vehicle control. Specifically, based on travel control information received by the first transceiver 200 or the second transceiver 202 (for example, acceleration information corresponding to an accelerator depression amount), and/or travel control information such as the engine revolution speed of the internal combustion engine 102 output by the engine monitoring unit 222 of the functional control unit 212, the overall operation control unit 230 of the management control unit 214 generates, as travel control information, information such as information of the torque required of the internal combustion engine 102 and the drive motor 104 (required torque information), and information indicating start and stop timings for energy recovery operations of the battery 108 using the drive motor 104. The overall operation control unit 230 of the management control unit 214 outputs this travel control information to the functional control unit 212, and sends this travel control information to the communications control unit 210 to be transmitted to the other ECUs.

Moreover, the fault monitoring unit 232 of the management control unit 214 monitors the reception notification signals output by the first transceiver 200 via the communications control unit 210. When no reception notification signal has been output for a specific duration or greater, the fault monitoring unit 232 determines that a fault has occurred in the first communications network 140, and outputs a network fault notification indicating that a fault has occurred in the first communications network 140, to the substitute NW instruction unit 234. Likewise, when the fault monitoring unit 232 has received network fault information indicating that a fault has occurred in the first communications network 140 from one of the other ECUs via the communications control unit 210, the fault monitoring unit 232 determines that a fault has occurred in the first communications network 140, and outputs network fault notification to the substitute NW instruction unit 234.

In response to receiving a network fault notification from the fault monitoring unit 232, the substitute NW instruction unit 234 of the management control unit 214 outputs to the control unit 210 of the same device a substitute network usage instruction (substitute NW usage instruction) prohibiting use of the first communications network 140 and instructing that travel control information be passed over the second communications network 142, and sets the communications control unit 210 to substitute network operation.

Moreover, after outputting the substitute network usage instruction, the substitute NW instruction unit 234 uses the second transceiver 202 to transmit a substitute network usage command (substitute NW usage command) to all of the other ECUs over the second communications network 142, prohibiting use of the first communications network 140 and instructing travel control information to be passed over the second communications network 142.

Note that when the substitute NW instruction unit 234 transmits the substitute NW usage command, the substitute NW instruction unit 234 appends an ID code (identification code) indicating a maximum priority level to the substitute NW usage command using the CAN communication protocol. This thereby enables such commands to be issued over the second communications network 142 with higher priority than other commands and other information.

Moreover, after transmitting the substitute NW usage command, after a specific duration has elapsed in order to allow the other ECUs sufficient time to prepare to execute the substitute NW usage command, the substitute NW instruction unit 234 transmits an emergency cranking start instruction to the emergency cranking unit 236.

In response to receiving the emergency cranking start instruction from the substitute NW instruction unit 234, the emergency cranking unit 236 of the management control unit 214 acquires information indicating whether or not the internal combustion engine 102 is stopped from the engine monitoring unit 222 of the functional control unit 212. The emergency cranking unit 236 starts emergency cranking if the internal combustion engine 102 is stopped.

The emergency cranking unit 236 performs emergency cranking as follows. First, the emergency cranking unit 236 transmits a rotation shaft connection command over the second communications network 142 to the ECU 126 to instruct that the crank shaft of the internal combustion engine 102 and the rotation shaft of the drive motor 104 be connected together. The emergency cranking unit 236 then transmits a cranking start command over the second communications network 142 to the motor control ECU 122 to instruct rotation of the drive motor 104 for a specific duration in order to perform cranking.

The emergency cranking unit 236 then determines whether or not the internal combustion engine 102 has started up. If the internal combustion engine 102 has started up, the emergency cranking operation is ended. However, if the internal combustion engine 102 has not started up, the emergency cranking unit 236 retransmits the cranking start command, and cranking is performed again. Note that if cranking is repeated more than a specific number of times, the emergency cranking unit 236 may execute specific error processing (for example, to send out an error warning sound from a vehicle-installed speaker (not illustrated in the drawings)).

Motor Control ECU Configuration

Figure 3:
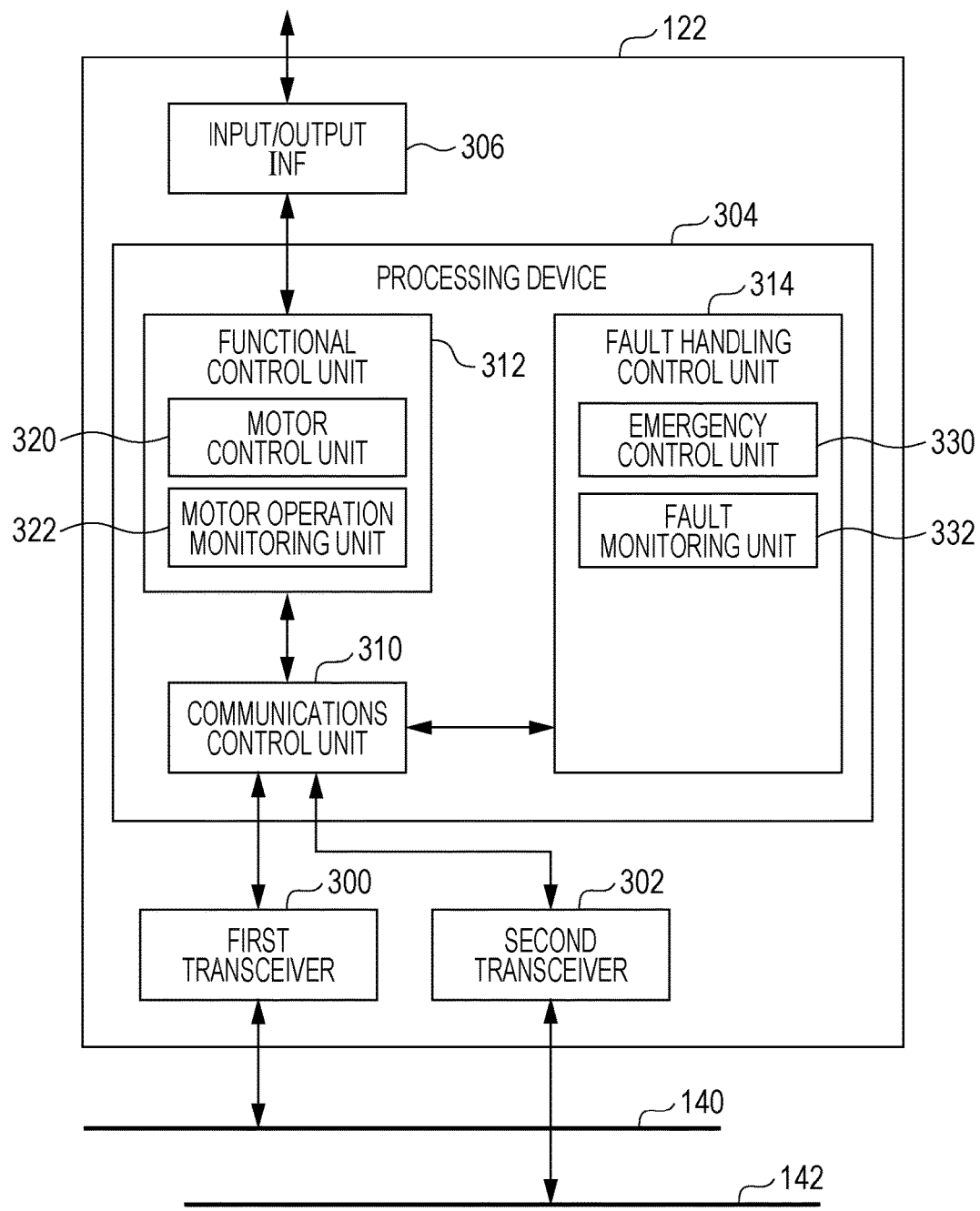
FIG. 3 is a diagram illustrating a configuration of a motor control ECU provided to the vehicle control system illustrated in FIG. 1.

Next, explanation follows regarding configuration of the motor control ECU 122. FIG. 3 is a diagram illustrating configuration of the motor control ECU 122. The motor control ECU 122 includes a first transceiver 300, a second transceiver 302, a processing device 304, and an input/output interface (input/output INF) 306.

The first transceiver 300 and the second transceiver 302 are transceivers for communicating over the first communications network 140 and communicating over the second communications network 142, respectively. Both the first transceiver 300 and the second transceiver 302 may, for example, be CAN transceivers that communicate using the CAN communication protocol.

The first transceiver 300 and the second transceiver 302 each include a reception buffer (not illustrated in the drawings) and a transmission buffer (not illustrated in the drawings). The first transceiver 300 and the second transceiver 302 each receive data over the first communications network 140 and the second communications network 142 using the CAN communication protocol, store the received data in their respective reception buffers, and output a reception notification signal indicating that the data has been received to the processing device 304. Moreover, the first transceiver 300 and the second transceiver 302 each use the CAN communication protocol to transmit data stored in their respective transmission buffers over the first communications network 140 and the second communications network 142 in sequence, based on an order of priority appended to the data.

Via the motor drive device 106, the input/output INF 306 receives signals from respective sensors (not illustrated in the drawings) provided to the drive motor 104, and inputs the signals to the processing device 304. The input/output INF 306 also receives signals output from the processing device 304 to the motor drive device 106 in order to control the drive motor 104, and outputs the signals to the motor drive device 106.

The processing device 304 is a computer including a processor such as a Central Processing Unit (CPU), Read Only Memory (ROM) on which programs are written, Random Access Memory (RAM) for temporary data storage, a communications control unit 310, a functional control unit 312, and a fault handling control unit 314. The functional control unit 312 includes a motor control unit 320 and a motor operation monitoring unit 322, and the fault handling control unit 314 includes an emergency control unit 330, and a fault monitoring unit 332.

Each of the above units of the processing device 304 is implemented by the processing device 304 computer executing a program. These computer programs may be stored in advance on an appropriate computer-readable storage medium. Alternatively, or additionally, all or some of the above units may be configured from hardware, each including one or more electronic circuit components.

Note that the fault monitoring unit 332 is a fault detection unit, the functional control unit 312 is a motor control unit, and the emergency control unit 330 is a fault processing unit.

The communications control unit 310 manages and controls communications over the first communications network 140 and the second communications network 142 by the first transceiver 300 and the second transceiver 302. Specifically, the communications control unit 310 receives reception notification signals respectively output by the first transceiver 300 and the second transceiver 302 on receipt of data over the first communications network 140 and the second communications network 142, and reads the respective data that has been received (received data) from the reception buffer of the corresponding first transceiver 300 and/or second transceiver 302 in response to receiving the reception notification signal. Moreover, the communications control unit 310 outputs the read received data to the functional control unit 312 and the fault handling control unit 314.

The communications control unit 310 receives the travel control information and/or the travel management information from the functional control unit 312 and/or the fault handling control unit 314, and stores the received travel control information in the transmission buffer (not illustrated in the drawings) of the first transceiver 300, and/or stores the received travel management information in the transmission buffer (not illustrated in the drawings) of the second transceiver 302. Note that the functional control unit 312 and the fault handling control unit 314 append a code, this being a unique identification code (ID code) indicating the information priority level, to each item of travel control information and travel management information, and outputs the travel control information and the travel management information.

The communications control unit 310 identifies whether information is travel control information or travel management information from the ID codes appended to the information received from the functional control unit 312 and/or the fault handling control unit 314. If the information is travel control information, the information is stored in the transmission buffer of the first transceiver 300. If the information is travel management information, the information is stored in the transmission buffer of the second transceiver 302.

Moreover, when a substitute NW usage instruction has been received from the emergency control unit 330, described later, the communications control unit 310 transitions to substitute network operation. In substitute network operation, the communications control unit 310 stores all information received from the functional control unit 312 and/or the fault handling control unit 314 in the transmission buffer of the second transceiver 302, irrespective of the information ID code. Moreover, if the first transceiver 300 is provided with a sleep mode to stop main operations and suppress electric power consumption, the communications control unit 310 transitions the first transceiver 300 to the sleep mode.

The information stored in the respective transmission buffers of the first transceiver 300 and the second transceiver 302 is output to the first communications network 140 or the second communications network 142 by the first transceiver 300 or the second transceiver 302, according to the priority level indicated by the ID code of each item of information.

Note that the second transceiver 302 may be preset with rules for how to determine the transmission priority level of the information respectively passed over the second communications network 142 from the ID code appended to each item of information making up the travel management information and the travel control information in cases in which both travel management information and travel control information are stored together in the transmission buffer of the second transceiver 302.

The functional control unit 312 controls and monitors operation of the drive motor 104 via the motor drive device 106. The functional control unit 312 also generates travel control information and travel management information, and transmits the travel control information and travel management information to the other ECUs using the communications control unit 310.

Specifically, the motor control unit 320 of the functional control unit 312 controls operation of the drive motor 104 according to signals from the respective sensors (not illustrated in the drawings) provided to the drive motor 104, and/or travel control information received by the first transceiver 300 or the second transceiver 302, or according to instructions from the emergency control unit 330 of the fault handling control unit 314, described later.

Moreover, the motor operation monitoring unit 322 of the functional control unit 312 receives sensor signals from the respective sensors provided to the drive motor 104, and, based on the received sensor information, generates travel control information including, for example, a revolution speed of the drive motor 104, and travel management information including, for example, temperature and current values of the drive motor 104. The motor operation monitoring unit 322 then sends the generated travel control information and travel management information to the communications control unit 310 to be transmitted to the other ECUs.

The fault handling control unit 314 monitors whether or not a fault has occurred in the first communications network 140. Moreover, when a fault with the first communications network 140 has been detected and/or a substitute NW usage command has been received from the management ECU 120, the fault handling control unit 314 uses the functional control unit 312 to perform drive motor 104 emergency control as a fault handling operation.

Specifically, the fault monitoring unit 332 of the fault handling control unit 314 monitors the reception notification signals output by the first transceiver 300 via the communications control unit 310. When no reception notification signal has been output for a specific duration or greater, the fault monitoring unit 332 determines that a fault has occurred in the first communications network 140, and outputs a network fault notification, indicating that a fault has occurred in the first communications network 140, to the emergency control unit 330.

In response to receiving a network fault notification from the fault monitoring unit 332, the emergency control unit 330 of the fault handling control unit 314 instructs the functional control unit 312 to stop operation of the drive motor 104, and uses the communications control unit 310 and second transceiver 302 to transmit network fault information indicating that a fault has occurred in the first communications network 140 to the management ECU 120 over the second communications network 142.

The emergency control unit 330 acquires received data received by the first transceiver 300 and the second transceiver 302 from the communications control unit 310. When a substitute NW usage command has been received from the management ECU 120, the emergency control unit 330 instructs the functional control unit 312 to stop operation of the drive motor 104 if the drive motor 104 is currently operating, and outputs, to the communications control unit 310, a substitute NW usage instruction prohibiting use of the first communications network 140 and instructing that travel control information be passed over the second communications network 142.

Moreover, when the emergency control unit 330 has received a cranking start command from the management ECU 120 via the communications control unit 310, the emergency control unit 330 instructs the functional control unit 312 to rotate the drive motor 104 for a specific duration in order to crank the internal combustion engine 102.

Configuration of the Other ECUs

Figure 4:
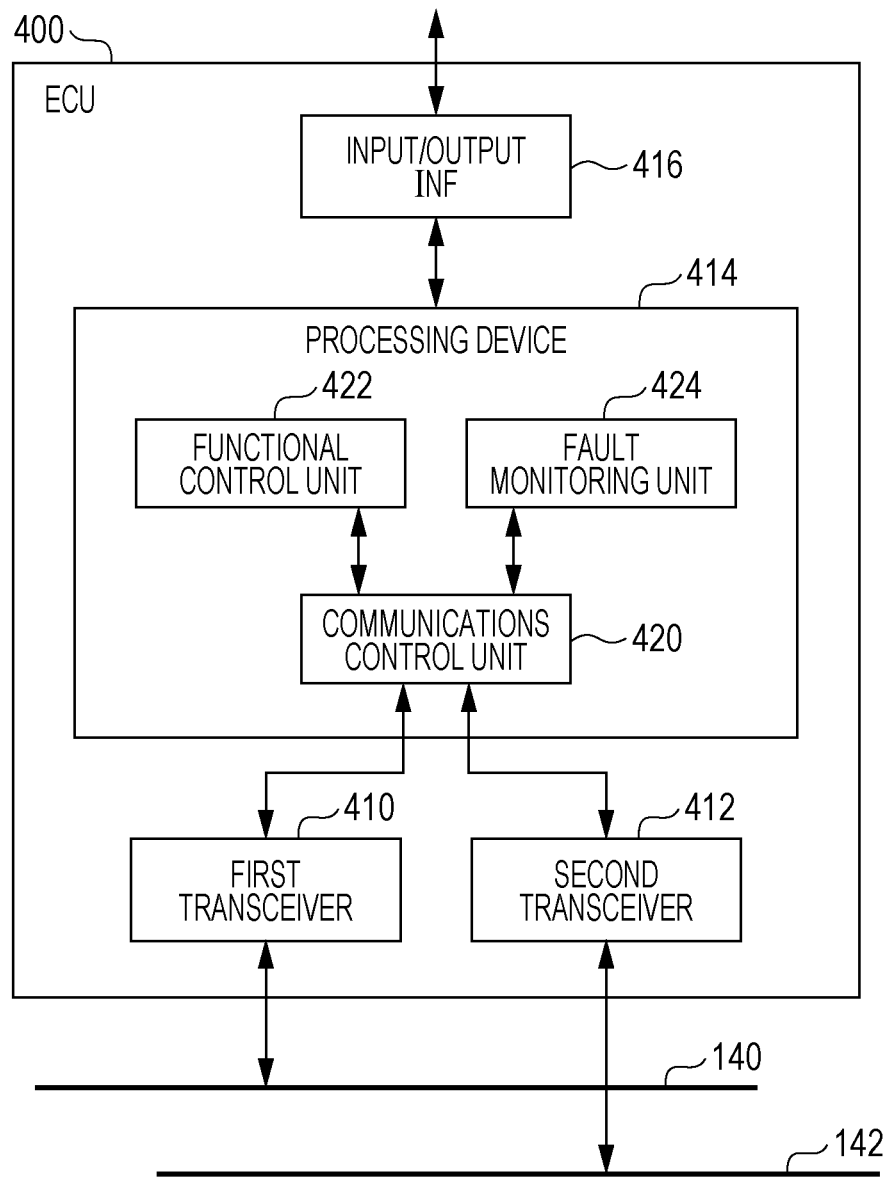
FIG. 4 is a diagram illustrating a configuration of another ECU, which is neither the management ECU nor the motor control ECU, provided to the vehicle control system illustrated in FIG. 1.

Next, explanation follows regarding configuration of the ECUs 124, 126, 128, 130, 132, and 134, with reference to the configuration diagram illustrated by FIG. 4. Note that in the vehicle control system 100 of the present embodiment, these ECUs differ only in some of the functions executed by their respective functional control units, for example, and otherwise have similar configuration elements for operation relating to faults in the first communications network 140. Accordingly, FIG. 4 illustrates common configurations in these ECUs, and in the following explanation, the configuration of the respective ECUs 124, 126, 128, 130, 132, and 134 is dealt with using the example of the ECU 124. Note that where portions of the ECUs 126, 128, 130, 132, and 134 differ from the ECU 124, these differences will be described in the explanation of the corresponding portions.

For example, the ECU 400 illustrated to represent the ECU 124 in FIG. 4 includes a first transceiver 410, a second transceiver 412, a processing device 414, and an input/output interface (input/output INF) 416.

The first transceiver 410 and the second transceiver 412 are respectively transceivers for communicating over the first communications network 140 and communicating over the second communications network 142. Both the first transceiver 410 and the second transceiver 412 may, for example, be CAN transceivers that communicate using the CAN communication protocol.

The first transceiver 410 and the second transceiver 412 each include a reception buffer (not illustrated in the drawings) and a transmission buffer (not illustrated in the drawings). The first transceiver 410 and the second transceiver 412 receive data over the first communications network 140 and the second communications network 142 respectively, using the CAN communication protocol, and store the received data in their respective reception buffers and output a reception notification signal indicating that the data has been received to the processing device 414. Moreover, the first transceiver 410 and the second transceiver 412 each use the CAN communication protocol to transmit data stored in their respective transmission buffers over the first communications network 140 and the second communications network 142 in sequence, based on an order of priority appended to the data.

The input/output INF 416 receives signals from various sensors (not illustrated in the drawings) provided to the battery 108, and inputs these signals to the processing device 414. The input/output INF 416 also receives, for example, setting instruction signals (for example, switching instructions to start/stop charging) output from the processing device 414 to the battery 108, and outputs these setting instruction signals to the battery 108. When the ECU 400 is the ECU 126, the input/output INF 416 has a function of relaying signals exchanged between the transmission 110 and the processing device 414. Moreover, when the ECU 400 is the ECU 128, 130, or 132, the input/output INF 416 has a function of relaying signals respectively exchanged between a brake pedal sensor (not illustrated in the drawings), an accelerator pedal sensor (not illustrated in the drawings), or various other sensors (not illustrated in the drawings), and the processing device 414. ECUs not directly connected to external devices, such as the ECU 134, need not be provided with the input/output INF 416.

The processing device 414 is a computer including a processor such as a Central Processing Unit (CPU), Read Only Memory (ROM) on which programs are written, Random Access Memory (RAM) for temporary data storage, a communications control unit 420, a functional control unit 422, and a fault monitoring unit 424.

Each of the above units of the processing device 414 is implemented by the processing device 414 computer executing a program. These computer programs may be stored in advance on an appropriate computer-readable storage medium. Alternatively, or additionally, all or some of the above units may be configured from hardware, each including one or more electronic circuit components.

The communications control unit 420 manages and controls communications over the first communications network 140 and the second communications network 142 by the first transceiver 410 and the second transceiver 412. Specifically, the communications control unit 420 receives reception notification signals respectively output by the first transceiver 410 and the second transceiver 412 on receipt of data over the first communications network 140 and the second communications network 142, and reads the data that has been received (received data) from the reception buffer of the corresponding first transceiver 410 and/or second transceiver 412 in response to receiving the reception notification signal. The communications control unit 420 also outputs the read received data to the functional control unit 422 and the fault monitoring unit 424.

The communications control unit 420 receives the travel control information and/or the travel management information from the functional control unit 422 and/or the fault monitoring unit 424, and stores the received travel control information in the transmission buffer (not illustrated in the drawings) of the first transceiver 410, and/or stores the received travel management information in the transmission buffer (not illustrated in the drawings) of the second transceiver 412. Note that the functional control unit 422 and/or the fault monitoring unit 424 append a code, this being a unique identification code (ID code) indicating the information priority level, to each item of travel control information and travel management information, and output the travel control information and the travel management information.

The communications control unit 420 identifies whether information is travel control information or travel management information from the ID codes appended to the information received from the functional control unit 422 and/or the fault monitoring unit 424. If the information is travel control information, the information is stored in the transmission buffer of the first transceiver 410. If the information is travel management information, the information is stored in the transmission buffer of the second transceiver 412.

Moreover, when a substitute NW usage instruction has been received from the fault monitoring unit 424, the communications control unit 420 transitions to substitute network operation. In substitute network operation, the communications control unit 420 stores all information received from the functional control unit 422 and/or the fault monitoring unit 424 in the transmission buffer of the second transceiver 412, irrespective of the information ID code. Moreover, if the first transceiver 410 is provided with a sleep mode to stop main operations and suppress electric power consumption, the communications control unit 420 transitions the first transceiver 410 to the sleep mode.

The information stored in the respective transmission buffers of the first transceiver 410 and the second transceiver 412 is output to the first communications network 140 or the second communications network 142 by the first transceiver 410 or the second transceiver 412, respectively, according to the priority level indicated by the ID code of each item of information.

Note that the second transceiver 412 may be preset with rules for how to determine the transmission priority level of the respective information passed over the second communications network 142 from the ID code appended to each item of information making up the travel management information and the travel control information in cases in which both travel management information and travel control information are stored together in the transmission buffer of the second transceiver 412.

The functional control unit 422 performs specific functional control and operation monitoring. For example, when the ECU 400 is the ECU 124, the functional control unit 422 performs operation settings to start and stop charging of the battery 108, and also receives signals from the various sensors (not illustrated in the drawings) provided to the battery 108 to monitor operation states of the battery 108. The functional control unit 422 also generates travel control information and travel management information, and transmits the travel control information and travel management information to the other ECUs using the communications control unit 420.

When the ECU 400 is the ECU 126, the functional control unit 422 controls operation of the transmission 110 based on the travel control information and/or the travel management information received via the communications control unit 420. The functional control unit 422 also connects the crank shaft of the internal combustion engine 102 and the rotation shaft of the drive motor 104 together in response to receiving a rotation shaft connection command from the management ECU 120.

Moreover, when the ECU 400 is the ECU 128, 130, 132, or 134, the functional control unit 422 respectively performs brake pedal depression amount detection, accelerator pedal depression amount detection, information gathering relating to vehicle body balance, or abnormality occurrence detection based on the travel management information. The functional control unit 422 also generates travel control information and/or travel management information, and uses the communications control unit 420 to transmit the travel control information and/or travel management information to the other ECUs.

The fault monitoring unit 424 monitors reception notification signals output by the first transceiver 410 via the communications control unit 420. When no reception notification signal has been output for a specific duration or greater, the fault monitoring unit 424 determines that a fault has occurred in the first communications network 140, and uses the communications control unit 420 to transmit network fault information, indicating that a fault has occurred in the first communications network 140, to the management ECU 120 using the second transceiver 412 and the second communications network 142.

The fault monitoring unit 424 acquires received data, received by the first transceiver 410 and the second transceiver 412, from the communications control unit 420. When a substitute NW usage command has been received from the management ECU 120, the fault monitoring unit 424 outputs, to the communications control unit 420, a substitute NW usage instruction prohibiting use of the first communications network 140 and instructing that travel control information be passed over the second communications network 142.

Next, explanation follows regarding processing relating to faults on the first communications network 140 (network fault processing) by the management ECU 120, the motor control ECU 122, and the other ECUs 124, 126, 128, 130, 132, and 134.

Network Fault Processing by Management ECU

Figure 5:
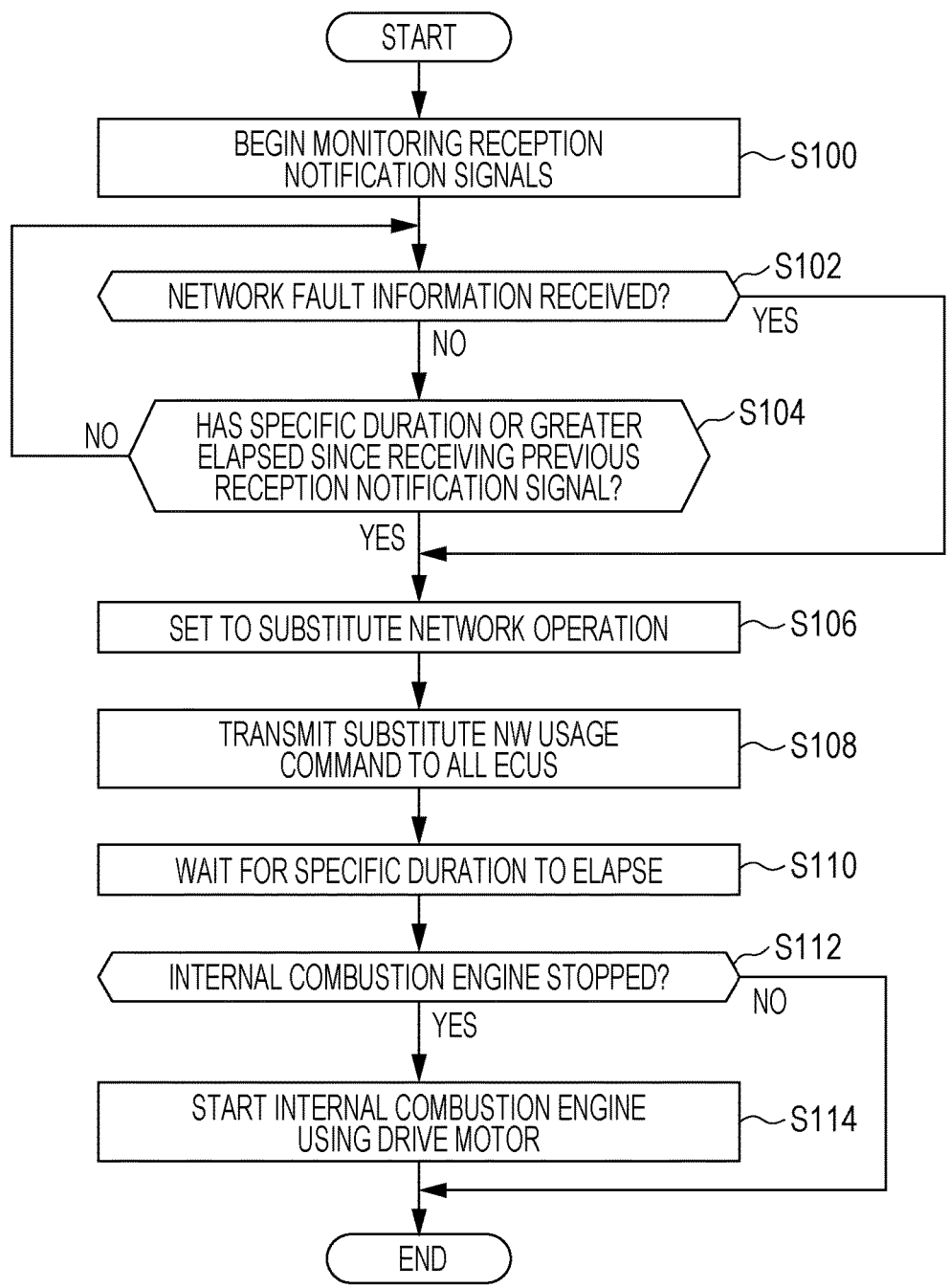
FIG. 5 is a flowchart illustrating a network fault processing routine of the management ECU provided to the vehicle control system illustrated in FIG. 1.

First, explanation follows regarding network fault processing by the management ECU 120, with reference to the flowchart illustrated in FIG. 5. This processing begins when the power source of the management ECU 120 is turned ON. Note that this processing is executed in parallel with other processing, such as processing of the functional control unit 212 to control and monitor the internal combustion engine 102.

When processing starts, first, the fault monitoring unit 232 begins monitoring the reception notification signals output by the communications control unit 210 (S100). Then, based on the received data output from the communications control unit 210, the fault monitoring unit 232 determines whether or not network fault information has been received from any out of the other ECUs 122, 124, 126, 128, 130, 132, and 134 (S102). When network fault information has not been received (S102=NO), the fault monitoring unit 232 determines whether or not the specific duration or greater has elapsed since a timing at which the previous reception notification signal was received from the communications control unit 210 (S104). When the specific duration has not elapsed (S104=NO), processing returns to step S102 and is repeated.

However, when network fault information has been received from one of the ECUs at step S102 (S102=YES), or when the specific duration or greater has elapsed since the timing at which the previous reception notification signal was received from the communications control unit 210 at step S104 (S104=YES), the fault monitoring unit 232 determines that a fault has occurred in the first communications network 140, and outputs a network fault notification to the substitute NW instruction unit 234. In response to receiving the network fault notification, the substitute NW instruction unit 234 outputs, to the communications control unit 210 of the same device, a substitute NW usage instruction, prohibiting use of the first communications network 140 and instructing that travel control information be passed over the second communications network 142. The substitute NW instruction unit 234 also sets the communications control unit 210 to substitute network operation (S106).

The substitute NW instruction unit 234 also uses the second transceiver 202 to transmit, over the second communications network 142, a substitute network usage command (substitute NW usage command) prohibiting use of the first communications network 140 and instructing that travel control information be passed over the second communications network 142, to all the other ECUs 122, 124, 126, 128, 130, 132, and 134 (S108).

Next, after the substitute NW usage command has been transmitted, the motor control ECU 122 stops operation of the drive motor 104, and after waiting for a specific duration to elapse in order to allow the other ECUs sufficient time to prepare to execute the substitute NW usage command (S110), the emergency cranking unit 236 queries the engine control unit 220 to determine whether or not the internal combustion engine 102 is stopped (S112). If the internal combustion engine 102 is stopped (S112=YES), the emergency cranking unit 236 outputs an instruction to the internal combustion engine 102, and communicates with the motor control ECU 122 and the ECU 126 over the second communications network 142, in order to crank the internal combustion engine 102 using the drive motor 104. The processing ends after operation of the internal combustion engine 102 has started up (S114).

For example, after transmitting a rotation shaft connection command to the ECU 126, which controls the transmission 110, to instruct connection of the crank shaft of the internal combustion engine 102 and the rotation shaft of the drive motor 104, the emergency cranking unit 236 performs the cranking by transmitting, to the motor control ECU 122, a cranking start command instructing that the drive motor 104 be rotated so as to perform cranking for a specific duration.

However, if the internal combustion engine 102 is determined to be in operation at step S112 (S112=NO), the current processing is simply ended, and operation of the internal combustion engine 102 is continued.

Note that in the present embodiment, the fault monitoring unit 232 of the management ECU 120 determines that a fault has occurred in the first communications network 140 on receipt of network fault information from any of the ECUs (step S102). However, there is no limitation thereto, and the fault monitoring unit 232 may determine that a fault has occurred when network fault information has been received from a specific number of the other ECUs (for example, from plural specified ECUs). This thereby enables the management ECU 120 to be prevented from incorrectly determining a fault that has simply occurred in one or more individual ECUs to be a fault in the first communications network 140 itself (for example, a fault due to disconnection of the first communications network 140 bus).

Network Fault Processing by Motor Control ECU

Figure 6:
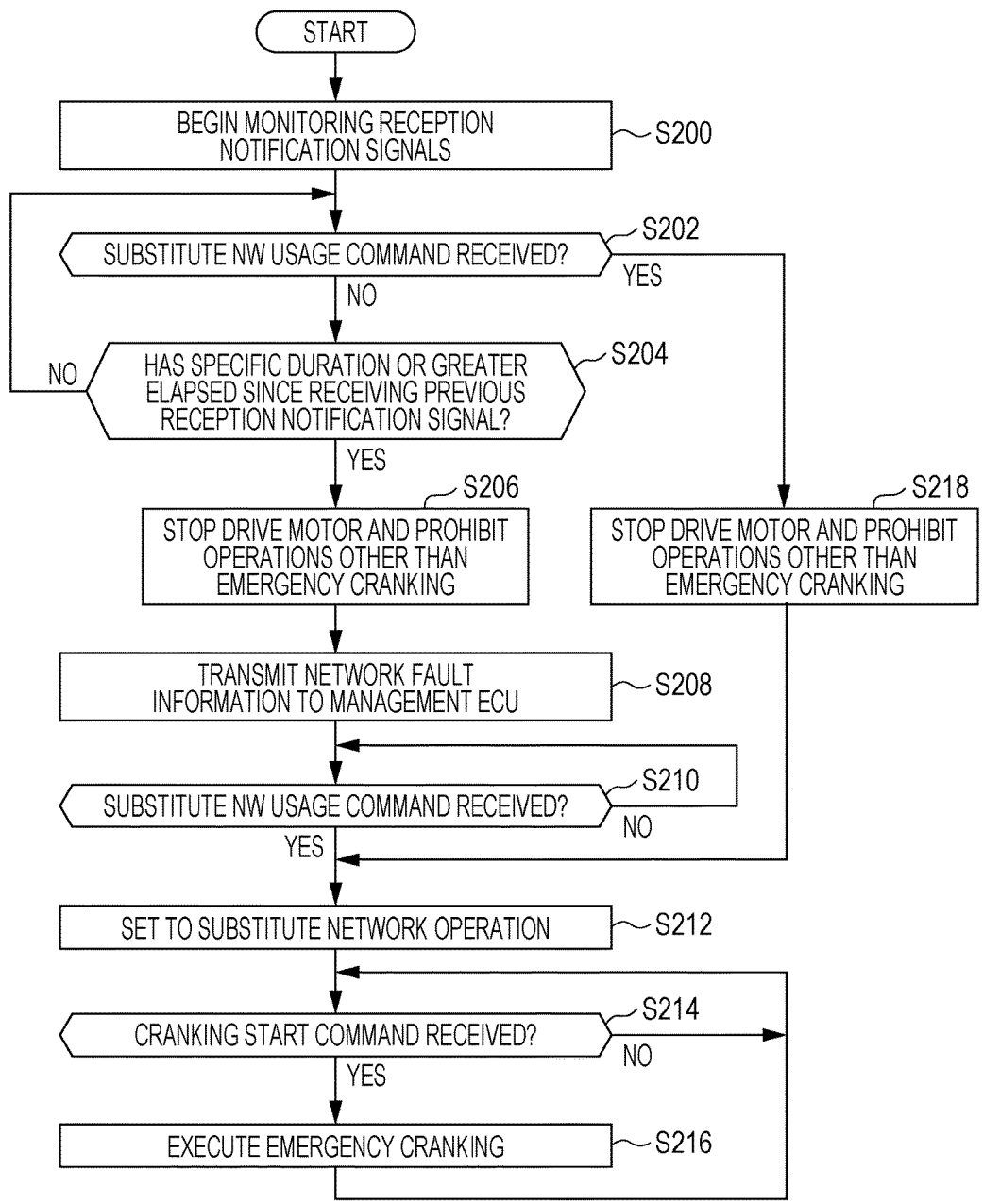
FIG. 6 is a flowchart illustrating a network fault processing routine of the motor control ECU provided to the vehicle control system illustrated in FIG. 1.

Next, explanation follows regarding network fault processing by the motor control ECU 122, with reference to the flowchart illustrated in FIG. 6. This processing begins when the power source of the motor control ECU 122 is turned ON, and ends when the power source of the motor control ECU 122 is turned OFF. Note that this processing is executed in parallel with other processing, such as processing of the functional control unit 312 to control and monitor operation of the drive motor 104.

When processing starts, first, the fault monitoring unit 332 begins monitoring the reception notification signals output by the communications control unit 310 (S200). Then, based on the received data output from the communications control unit 310, the fault monitoring unit 332 determines whether or not a substitute NW usage command has been received from the management ECU 120 (S202). When a substitute NW usage command has not been received (S202=NO), the fault monitoring unit 332 determines whether or not the specific duration or greater has elapsed since a timing at which the previous reception notification signal was received from the communications control unit 310 (S204). When the specific duration has not elapsed (S204=NO), processing returns to step S202 and is repeated.

However, when the specific duration or greater has elapsed since the timing at which the previous reception notification signal was received from the communications control unit 310 at step S204, (S204=YES), the fault monitoring unit 332 determines that a fault has occurred in the first communications network 140, and instructs the functional control unit 312 to stop the drive motor 104, and prohibits the functional control unit 312 from any operation other than emergency cranking (S206). Moreover, the fault monitoring unit 332 uses the communications control unit 310 and the second transceiver 302 to transmit network fault information indicating that a fault has occurred in the first communications network 140 to the management ECU 120 over the second communications network 142 (S208).

Moreover, based on the received data output from the communications control unit 310, the emergency control unit 330 determines whether or not a substitute NW usage command has been received from the management ECU 120 (S210). When a substitute NW usage command has not been received (S210=NO), processing returns to step S210 and the emergency control unit 330 stands by to receive. However, when a substitute NW usage command has been received from the management ECU 120 (S210 =YES), after setting the communications control unit 310 to substitute network operation (S212), the emergency control unit 330 determines, based on the received data output from the communications control unit 310, whether or not a cranking start command has been received from the management ECU 120 (S214).

Then, when a cranking start command has not been received (S214=NO), processing returns to step S214 to stand by to receive. When a cranking start command has been received (S214=YES), the functional control unit 312 is instructed to execute emergency cranking (specifically, for example, to rotate the drive motor 104 for a specific duration) (S216).

However, when a substitute NW usage command has been received from the management ECU 120 at step S202 (S202=YES), the functional control unit 312 is instructed to stop the drive motor 104, and the functional control unit 312 is prohibited from any operation other than emergency cranking (S218), after which processing transitions to step S212.

Accordingly, after emergency cranking has been executed at step S216, processing returns to step S214 and is repeated. Thereafter, cranking is executed when a cranking start command is received again. Note that the present processing ends when the power source of the motor control ECU 122 is turned OFF.

Network Fault Processing by the Other ECUs

Next, explanation follows regarding network fault processing by the other ECUs 124, 126, 128, 130, 132, and 134. Note that in the vehicle control system 100 of the present embodiment, the processing by these ECUs differs only in, for example, some of the control functions executed by the respective functional control units (corresponding to reference numeral 422 in FIG. 4), and other network fault processing relating to faults in the first communications network 140 is the same. Accordingly, in the following explanation, the ECU 124 is used as an example to describe network fault processing for the ECUs 124, 126, 128, 130, 132, and 134, with reference to the flowchart illustrated in FIG. 7, and with the ECU 400 illustrated in FIG. 4 representing the ECU 124.

The current processing begins when the power source of the ECU 400 is turned ON. Note that this processing is executed in parallel with other processing, such as processing of the functional control unit 422 of the ECU 400 for specific functional control and function monitoring.

When processing starts, first, the fault monitoring unit 424 begins monitoring the reception notification signals output by the communications control unit 420 (S300). Then, based on the received data output from the communications control unit 420, the fault monitoring unit 424 determines whether or not a substitute NW usage command has been received from the management ECU 120 (S302). When a substitute NW usage command has not been received (S302=NO), the fault monitoring unit 424 determines whether or not the specific duration or greater has elapsed since a timing at which the previous reception notification signal was received from the communications control unit 420 (S304). When the specific duration has not elapsed (S304=NO), processing returns to step S302 and is repeated.

However, when the specific duration or greater has elapsed since the timing at which the previous reception notification signal was received from the communications control unit 420 at step S304, (S304=YES), the fault monitoring unit 424 determines that a fault has occurred in the first communications network 140, and uses the communications control unit 420 and the second transceiver 412 to transmit network fault information indicating that a fault has occurred in the first communications network 140 to the management ECU 120 over the second communications network 142 (S306).

Moreover, based on the received data output from the communications control unit 420, the fault monitoring unit 424 determines whether or not a substitute NW usage command has been received from the management ECU 120 (S308). When a substitute NW usage command has not been received (S308=NO), processing returns to step S308 and the fault monitoring unit 424 stands by to receive. However, when a substitute NW usage command has been received from the management ECU 120 (S308=YES), the communications control unit 420 is set to substitute network operation (S310), and the processing is ended.

However, when a substitute NW usage command has been received from the management ECU 120 at step S302 (S302=YES), processing transitions to step S310.

As described above, in the vehicle control system 100 of the present embodiment, when a fault has occurred in the first communications network 140 that is used to pass the travel control information, this being real-time information necessary for travel control, the management ECU 120 transmits a substitute NW usage command to all of the other ECUs, prohibiting the usage of the first communications network 140, and instructing that travel control information also be passed over the second communications network 142. Moreover, in response to receiving the substitute NW usage command, the motor control ECU 122 stops operation of the drive motor 104. Moreover, after transmitting the substitute NW usage command, the management ECU 120 uses the drive motor 104 to start up the internal combustion engine 102 if the internal combustion engine 102 is stopped, and then continues travel using the internal combustion engine 102.

Accordingly, the vehicle control system 100 enables safe travel to continue, without the vehicle becoming unable to travel, due to switching the communications network over which the travel control information is passed from the first communications network 140 to the second communications network 142 for all of the ECUs at the same time when a fault has occurred in the communications network, while effectively utilizing communication capacity without passing redundant information over the first communications network 140 and the second communications network 142 under normal circumstances.

Moreover, in the vehicle control system 100, when the motor control ECU 122 has detected a fault in the first communications network 140, the motor control ECU 122 stops operation of the drive motor 104 without waiting for an instruction from the management ECU 120. Accordingly, the vehicle control system 100 is capable of preventing a potentially unsafe state from occurring due to the vehicle continuing to travel using the drive motor 104 without the information necessary for travel control.

Note that in the present embodiment, the management ECU 120 has both control and monitoring functions with respect to the internal combustion engine 102. However, there is no limitation thereto, and configuration may be made in which an ECU other than the management ECU 120 (for example, an additional ECU not illustrated in FIG. 1) has control and monitoring functions with respect to the internal combustion engine 102, and the management ECU 120 is not provided with the functional control unit 212.

Moreover, in the present embodiment, the vehicle control system 100 includes eight ECUs (Electronic Control Units). However, there is no limitation thereto, and as long as the management ECU 120 and the motor control ECU 122 are included, the vehicle control system 100 may include a number of the plural ECUs other than eight. Note that in such cases, similarly to as described above, configuration may be made in which an ECU other than the management ECU 120 has control and monitoring functions with respect to the internal combustion engine 102, and in which the management ECU 120 is not provided with the functional control unit 212.

Moreover, in the present embodiment, the management ECU 120 transmits the substitute NW usage command. In response to receiving the substitute NW usage command, the motor control ECU 122 sets the communications control unit 310 to substitute network operation and stops operation of the drive motor 104 (S218, 5212 in FIG. 6). However, there is no limitation thereto, and configuration may be made in which, after the management ECU 120 has transmitted the substitute NW usage command, the management ECU 120 then transmits a motor stop instruction to stop operation of the drive motor 104 to the motor control ECU 122 over the second communications network 142. In such cases, the motor control ECU 122 can not only stop operation of the drive motor 104 when its own fault monitoring unit 332 has detected a fault in the first communications network 140, but can also stop operation of the drive motor 104 when the motor stop command has been received from the management ECU 120.

One aspect of the present disclosure describes a vehicle control system including plural electronic control units that control operation of a vehicle provided with an internal combustion engine and a drive motor for driving a wheel, and a first communications network and a second communications network that are connected to the respective electronic control units and that connect the respective electronic control units together so as to enable communication between the electronic control units. In this vehicle control system, the plural electronic control units include a management controller that manages overall travel control of the vehicle, and a motor drive controller that controls operation of the drive motor. The motor drive controller determines whether or not a fault has occurred in the first communications network, and when a fault has occurred, stops driving of the wheel by the drive motor, and transmits information indicating that a fault has occurred in the first communications network to the management controller over the second communications network. In response to receiving the information from the motor drive controller indicating that a fault has occurred in the first communications network, the management controller instructs all of the plural electronic control units not to communicate over the first communications network, and to communicate all information over the second communications network, and then uses the drive motor to start up the internal combustion engine.

Another aspect of the present disclosure describes a vehicle control system including plural electronic control units that control operation of a vehicle provided with an internal combustion engine and a drive motor for driving a wheel, and a first communications network and a second communications network that are connected to the respective electronic control units and that connect the respective electronic control units together so as to enable communication between the electronic control units. In this vehicle control system, the plural electronic control units include a management controller that manages overall travel control of the vehicle, and a motor drive controller that controls operation of the drive motor. Each of the plural electronic control units respectively detects any faults in the first communications network, and transmits information indicating that a fault has occurred in the first communications network to the management controller over the second communications network. The management controller determines that a fault has occurred in the first communications network when the management controller has itself detected a fault in the first communications network, and/or when the management controller has received the information indicating that a fault has occurred in the first communications network from at least one out of the plural electronic control units. When a fault has been determined to have occurred in the first communications network, the management controller instructs all of the plural electronic control units not to communicate over the first communications network, and to communicate all information over the second communications network, and uses the second communications network to make the motor drive controller stop driving of the wheel by the drive motor, and then using the drive motor to start up the internal combustion engine.

In another aspect of the present disclosure, configuration may be made in which, when a fault has not occurred in the first communications network, travel control information for controlling travel of the vehicle is passed over the first communications network, and travel management information for managing travel operation of the vehicle is passed over the second communications network.

Another aspect of the present disclosure describes a motor drive controller that is one of plural electronic control units in a vehicle control system including the plural electronic control units for controlling operation of a vehicle provided with an internal combustion engine and a drive motor for driving a wheel, and a first communications network and a second communications network connected to the respective electronic control units and connecting the plural electronic control units together so as to enable communication between the electronic control units. The motor drive controller includes: a first transceiver for communicating over the first communications network; a second transceiver for communicating over the second communications network; a fault detection unit that detects a fault in the first communications network; a motor control unit that controls the drive motor; and a fault processing unit that performs a specific fault processing operation when the fault detection unit has detected a fault in the first communications network. In response to the fault detection unit detecting a fault in the first communications network, the fault processing unit uses the second transceiver to transmit information indicating that a fault has occurred in the first communications network over the second communications network to a management controller that is one of the electronic control units, and instructs the motor control unit to stop driving of the wheel by the drive motor.

Another aspect of the present disclosure describes a management controller that is one of plural electronic control units in a vehicle control system including the plural electronic control units for controlling operation of a vehicle provided with an internal combustion engine and a drive motor for driving a wheel, and a first communications network and a second communications network connected to the respective electronic control units and connecting the plural electronic control units together so as to enable communication between the electronic control units. The management controller includes a first transceiver for communicating over the first communications network; a second transceiver for communicating over the second communications network; and a fault processing unit that performs a specific fault processing operation on receiving information through the second transceiver indicating that a fault has occurred in the first communications network. In response to receiving the information indicating that a fault has occurred in the first communications network, the fault processing unit instructs, over the second communications network using the second transceiver, all of the electronic control units connected to the first communications network and the second communications network not to communicate through the first communications network and to communicate all information through the second communications network, and, over the second communications network using the second transceiver, makes a motor drive controller controlling the drive motor for driving the wheel stop driving of the wheel by the drive motor, and then uses the drive motor to start up the internal combustion engine.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle control system comprising:
   electronic controllers to control a vehicle including an internal combustion engine and a drive motor to move the vehicle, the electronic controllers including a management controller to manage travel control of the vehicle and a motor drive controller to control the drive motor;
   a first communications network which connects the electronic controllers together and via which the electronic controllers communicate;
   a second communications network which connects the electronic controllers together and via which the electronic controllers communicate;
   the motor drive controller configured to stop the drive motor when it is determined that a fault has occurred in the first communications network and configured to transmit information indicating that the fault has occurred in the first communications network to the management controller via the second communications network; and
   the management controller configured to control the electronic controllers not to communicate via the first communications network in response to the information.

2. The vehicle control system of claim 1, wherein
   when the fault has not occurred in the first communications network, travel control information for controlling travel of the vehicle is passed over the first communications network, and travel management information for managing travel operation of the vehicle is passed over the second communications network.

3. The vehicle control system of claim 1, wherein
the management controller is configured to control the electronic controllers to communicate information via the second communications network when it is determined that the fault has occurred in the first communications network.

4. The vehicle control system of claim 1, wherein
vehicle control information, which is real-time information to control the vehicle, is transmitted via the first communications network, and
vehicle management information, which is non real-time information related to a travel of the vehicle, is transmitted via the second communications network.

5. The vehicle control system of claim 1, wherein
when the fault has not occurred in the first communications network, travel control information for controlling travel of the vehicle is passed over the first communications network, and
when the fault has occurred in the first communications network, the travel control information for controlling travel of the vehicle is passed over the second communications network.

6. A vehicle control system comprising:
electronic controllers to control a vehicle including an internal combustion engine and a drive motor to move the vehicle, the electronic controllers including a management controller to manage travel control of the vehicle and a motor drive controller to control the drive motor;
a first communications network which connects the electronic controllers together and via which the electronic controllers communicate;
a second communications network which connects the electronic controllers together and via which the electronic controllers communicate;
each of the electronic controllers configured to detect a fault in the first communications network and configured to transmit information indicating that the fault has occurred in the first communications network to the management controller via the second communications network;
the management controller configured to determine that the fault has occurred in the first communications network when the management controller has detected the fault in the first communications network, and/or when the management controller has received the information from at least one of the electronic controllers, the management controller being configured to control the electronic controllers not to communicate via the first communications network and to control the motor drive controller to stop the drive motor when it is determined that the fault occurs in the first communications network.

7. The vehicle control system of claim 6, wherein
when the fault has not occurred in the first communications network, travel control information for controlling travel of the vehicle is passed over the first communications network, and travel management information for managing travel operation of the vehicle is passed over the second communications network.

8. The vehicle control system of claim 6, wherein
the management controller is configured to control the electronic controllers to communicate information via the second communications network when it is determined that the fault has occurred in the first communications network.

9. The vehicle control system of claim 6, wherein
vehicle control information, which is real-time information to control the vehicle, is transmitted via the first communications network, and
vehicle management information, which is non real-time information related to a travel of the vehicle, is transmitted via the second communications network.

10. The vehicle control system of claim 6, wherein
when the fault has not occurred in the first communications network, travel control information for controlling travel of the vehicle is passed over the first communications network, and
when the fault has occurred in the first communications network, the travel control information for controlling travel of the vehicle is passed over the second communications network.

11. A motor drive controller that is one of electronic controllers in a vehicle control system including the electronic controllers to control a vehicle including an internal combustion engine and a drive motor to move the vehicle, a first communications network which connects the electronic controllers together and via which the electronic controllers communicate, and a second communications network which connects the electronic controllers together and via which the electronic controllers communicate, the motor drive controller comprising:
a first transceiver configured to communicate via the first communications network;
a second transceiver configured to communicate via the second communications network;
an electronic motor controller configured to control the drive motor; and
a processor configured to:
detect a fault in the first communications network; and
control the second transceiver to transmit information indicating that the fault has occurred in the first communications network via the second communications network to a management controller that is one of the electronic controllers and to control the motor controller to stop the drive motor in response to detecting the fault in the first communications network.

12. The motor drive controller of claim 11, wherein
vehicle control information, which is real-time information to control the vehicle, is transmitted via the first communications network, and
vehicle management information, which is non real-time information related to a travel of the vehicle, is transmitted via the second communications network.

13. The motor drive controller of claim 11, wherein
the processor is configured to control the electronic controllers not to communicate via the first communications network in response to detecting the fault in the first communications network.

14. The motor drive controller of claim 11, wherein
when the fault has not occurred in the first communications network, travel control information for controlling travel of the vehicle is passed over the first communications network, and travel management information for managing travel operation of the vehicle is passed over the second communications network.

15. The motor drive controller of claim 11, wherein
when the fault has not occurred in the first communications network, travel control information for controlling travel of the vehicle is passed over the first communications network, and
when the fault has occurred in the first communications network, the travel control information for controlling travel of the vehicle is passed over the second communications network.

16. A management controller that is one of electronic controllers in a vehicle control system including the electronic controllers to control a vehicle including an internal combustion engine and a drive motor to move the vehicle, a first communications network which connects the electronic controllers together and via which the electronic controllers communicate, and a second communications network which connects the electronic controllers together and via which the electronic controllers communicate, the management controller comprising:
- a first transceiver configured to communicate via the first communications network;
- a second transceiver configured to communicate via the second communications network; and
- a processor configured to control the electronic controllers not to communicate via the first communications network and to control a motor drive controller to stop the drive motor on receiving information via the second transceiver indicating that the fault has occurred in the first communications network.

17. The management controller of claim 16, wherein
the processor is configured to control the electronic controllers to communicate information via the second communications network when it is determined that the fault has occurred in the first communications network.

18. The management controller of claim 16, wherein
vehicle control information, which is real-time information to control the vehicle, is transmitted via the first communications network, and
vehicle management information, which is non real-time information related to a travel of the vehicle, is transmitted via the second communications network.

19. The management controller of claim 16, wherein
when the fault has not occurred in the first communications network, travel control information for controlling travel of the vehicle is passed over the first communications network, and travel management information for managing travel operation of the vehicle is passed over the second communications network.

20. The management controller of claim 16, wherein
when the fault has not occurred in the first communications network, travel control information for controlling travel of the vehicle is passed over the first communications network, and
when the fault has occurred in the first communications network, the travel control information for controlling travel of the vehicle is passed over the second communications network.

* * * * *